United States Patent [19]

Brooks

[11] Patent Number: 4,530,204

[45] Date of Patent: Jul. 23, 1985

[54] KNIFE GUARD FILLER FINGERS

[76] Inventor: Donald G. Brooks, 12 O'Malley St., Osborne Park, Australia, 6017

[21] Appl. No.: 644,477

[22] Filed: Aug. 27, 1984

[51] Int. Cl.³ ............................................. A01D 55/02
[52] U.S. Cl. ......................................... 56/298; 56/310
[58] Field of Search ................. 56/310, 307, 308, 312, 56/298, 296

[56] References Cited

U.S. PATENT DOCUMENTS 3,313,095   4/1967   Gaterman ............................ 56/312

*Primary Examiner*—Jay N. Eskovitz
*Attorney, Agent, or Firm*—Townsend and Townsend

[57] ABSTRACT

A knife guard filler finger assembly is provided with a mounting plate, rearwardly opening slots in the mounting plate which are positionable over bolts and beneath the lugs of original equipment fingers, the bolts securing the mounting plate to the cutting platform of a harvester, and fingers which project forwardly of the mounting plate and are located between the original equipment fingers of a harvester cutter platform. When fitted to a cutting platform, the filler fingers are generally positioned between, and at the same level as, the existing knife guard fingers.

9 Claims, 6 Drawing Figures

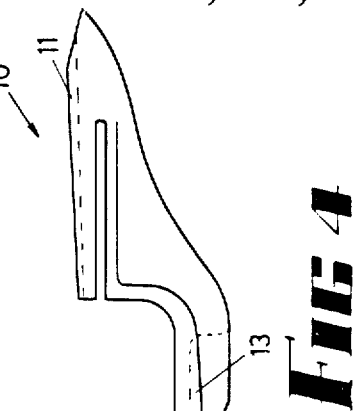
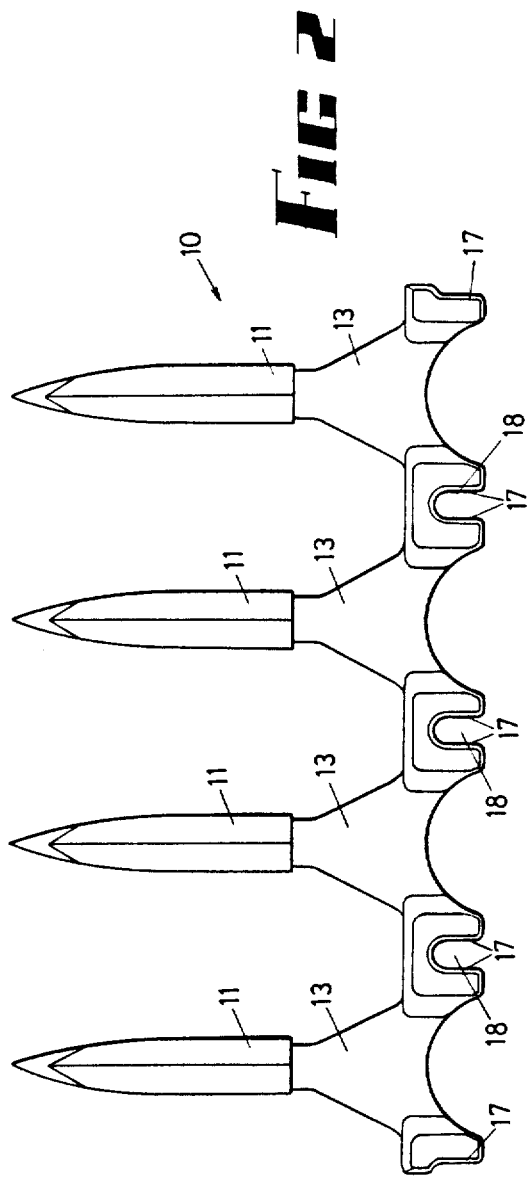
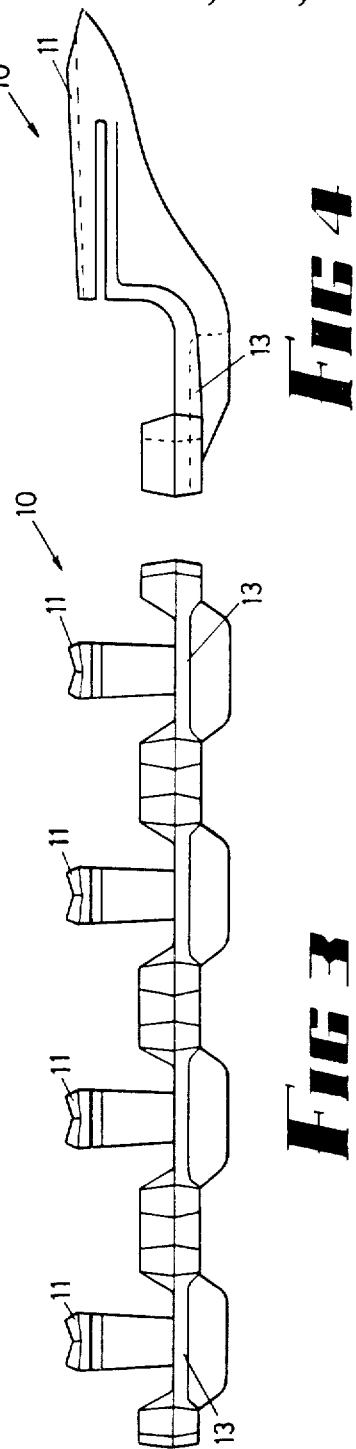

KNIFE GUARD FILLER FINGERS

This invention relates to grain harvester cutting platform assemblies and in particular to an improved knife guard filler finger attachment which is designed to be used in conjunction with original equipment knife guard fingers for the purpose of increasing the effective number of fingers and thereby reducing the finger spacing on pitch.

BACKGROUND OF THE INVENTION

Most open cut grain harvesters have knife guard fingers fitted to the cutting platform as original equipment, and this invention is limited to use with such platforms. Knife guard fingers are usually arranged in spaced array across a platform in a horizontal plane, and the platform vertically adjusted to travel at a selected height through a crop. The elongate fingers have knife receiving slots which guide knife cutting blades. These blades reciprocate in a transverse direction in relation to the longitudinal axis of the elongate fingers. The stalks of the crop are guided to the cutting blades by the knife guard fingers and subsequently cut, the stalks bearing against the knife guard fingers.

The most common arrangement is to have the knife guard fingers fixed to the cutting platform at intervals such that the pitch, or centre-to-centre spacing is 76 mm. The knife guard fingers are normally arranged in pairs, each finger being attached to a transverse mounting bar on the platform.

Each pair is fastened to the cutting platform by a pair of nuts and bolts which pass through holes in lugs which are also spaced at intervals of 76 mm along the cutting platform and which correspond to mounting holes in the mounting bar of the platform. Each finger projects forwardly of a respective lug.

The applicant is aware of a need whereby the knife guard fingers are at reduced intervals, and in particular half of the interval distance currently used; in other words 38 mm. This need has arisen as a result of the advent of double-cut knife sections, which are more advantageous when used in shatter-prone crops or when harvesting at higher than normal speeds. By increasing the number of fingers, and reducing the pitch, the crop is subject to less shaking by the knives as they cut, and there is much less loss due to "shatter". Incidence of knife section breakage is also reduced.

However, the need also still exists for the use of the original 76 mm spacing, especially when dealing with heavy weed situations or for the harvesting of thickly stemmed crops, or down entangled crops (lodged crops).

Presently, the only alternatives available to convert to a new spacing are to either modify the existing knife guard fingers by cutting and welding, or to purchase a new set of knife guard fingers with the required spacing. Whilst these are technically satisfactory, they do have their disadvantages. Consideration of such alternatives show that both of the methods involve additional costs and prove most time consuming having regard to fabrication requirements and the change-over time required to change from one set to the other.

It is the main object of the present invention to provide means whereby the pitch, or centre spacing, of original equipment knife guard fingers (for example, made in pairs) can be quickly and easily altered.

It is a further object of this invention to provide a new and improved knife guard finger attachment that can be used in association with original equipment guard fingers on commonly used harvesting machines, so as to vary the pitch of the fingers.

BRIEF SUMMARY OF THE INVENTION

In an embodiment of this invention, a knife guard finger assembly is provided with a mounting plate, rearwardly open slots in the mounting plate which are positionable over bolts and beneath the lugs of original equipment fingers, the bolts securing the mounting plate to the cutting platform of a harvester, and fingers which project forwardly of the mounting plate and are located between the original equipment fingers of a harvester cutter platform.

More specifically, the invention consists of a filler finger assembly comprising a mounting plate, surfaces defining rearwardly directed and rearwardly open slots on the mounting plate of such size and shape that the mounting plate is positionable over a plurality of said bolts and beneath said lugs to thereby be secured to said cutting platform, a plurality of spaced parallel support bars each extending forwardly of the mounting plate and each being between adjacent said slots therein, and a plurality of forwardly projecting fingers carried by respectsaid support bars.

The mounting plate is readily attached to the existing mounting system employed to fix the wider spaced original equipment knife guard finger units to the cutting platform of a harvesting machine, by simply slackening the nuts from the already positioned bolts and pushing the mounting plate between the lugs and nut (or bolt head). Each of the filler fingers comprises a horizontal knife receiving slot for receiving a knife blade in one of the embodiments of the invention. The arrangment is such that when fitted to a cutting platform the filler fingers are generally positioned between, and at the same level as, the existing knife guard fingers, so as to halve the pitch.

Preferably each filler finger assembly comprises four fingers, projecting forwardly of each mounting plate, the spacing between adjacent ones of which is the same as the spacing between the existing fingers. The filler fingers may alternatively be manufactured such that the knife section protrudes past the leading points of the fingers.

BRIEF DESCRIPTION OF THE DRAWINGS

Two embodiments of the invention are described hereunder in some detail with reference to, and are illustrated in, the accompanying drawings, in which

FIG. 2 is a plan view of a filler finger assembly,

FIG. 3 is a side elevation of FIG. 2,

FIG. 4 is an end elevation of FIG. 3,

Figure 1:
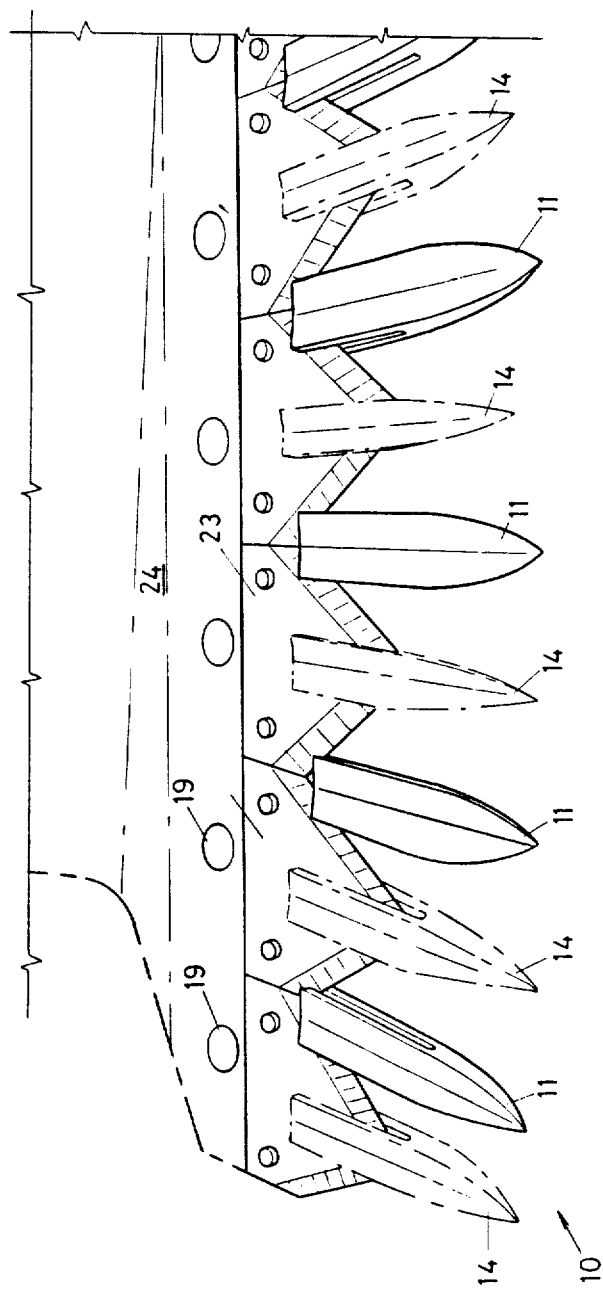
FIG. 1 is a fragmentary perspective view illustrating a grain harvester cutting platform having filler finger assemblies, according to the invention, secured thereto.
Figure 5:
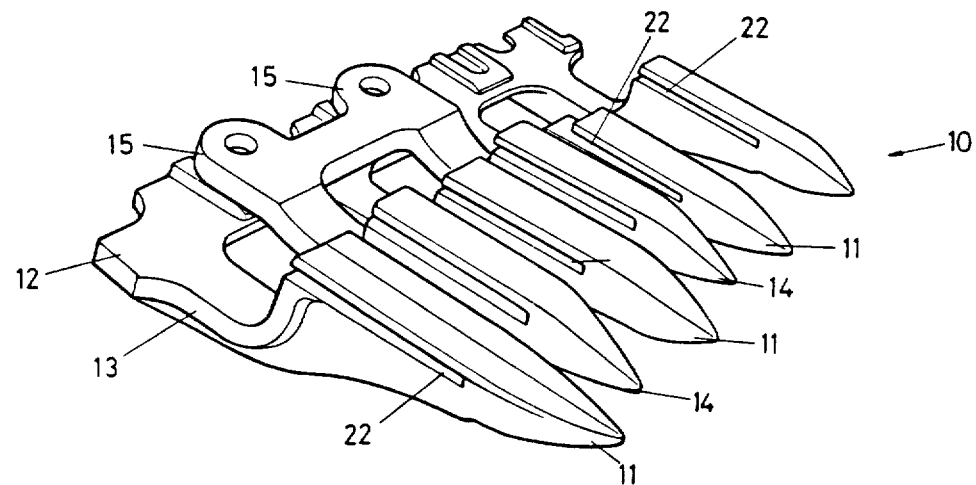
FIG. 5 is a perspective view which illustrates a pair of original equipment knife guard fingers, to which is secured a filler finger assembly comprising four filler fingers.

In the first embodiment of FIGS. 1 through to 5, a filler finger assembly 10 comprises a series of four knife guard filler fingers 11 carried by a transverse mounting plate 12. The filler fingers 11 extend forwardly from the mounting plate 12. They are connected to the mounting plate by spaced parallel support bars 13 the upper surfaces of which depend below the lower surfaces of the original equipment knife guard fingers 14 as seen best in FIG. 5. This enables the filler fingers 11 to be located below the mounting lugs 15 of the original equipment fingers 14. The rear edge of the mounting plate 12 is provided with surfaces 17 which define rearwardly directed and rearwardly opening slots 18 which are of such size and shape that by merely slackening the nut from the securing bolts 19 which form part of the original equipment, the support bars 13 can be pushed over the bolts 19 and when the nuts are retightened the upper surface of the mounting plate 12 is clamped with respect to the lower surfaces of mounting lugs 15 as seen best in FIG. 5, and this facility provides a very effective, fast way of being able to vary the pitch between the adjacent fingers.

The original equipment fingers 14 each contain a knife receiving slot 22 which accommodates the knives 23 which reciprocate across the cutting platform 24, and in this embodiment the filler fingers 11 also contain knife receiving slots which align with the knife receiving slots of the original equipment fingers 14.

Figure 6:
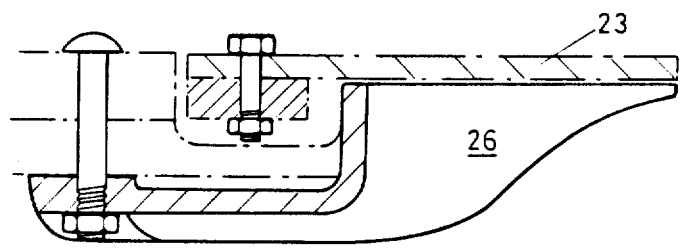
FIG. 6 is an end elevational section which illustrates a second embodiment wherein the knife section protrudes past the leading points of the fingers.

In the second embodiment of FIG. 6, the knives 23 overlie the entire area of respective filler fingers 26 and project slightly forwardly thereof, this arrangement being suitable for slightly heavier crops which nevertheless require knives of a reduced pitch.

The claims defining the invention are as follows:

1. For use on a grain harvester cutting platform having as original equipment a plurality of knife guard fingers which project forwardly of mounting lugs in spaced relationship with one another, a knife bar having drive means which reciprocally drives it across the cutting platform and knives thereon which co-operate with the knife guard fingers to sever the stalks of a grain harvester crop, and respective nut and bolt assemblies securing the lugs to the cutting platform:
a filler finger assembly comprising a mounting plate, surfaces defining rearwardly directed and rearwardly open slots on the mounting plate of such size and shape that the mounting plate is positionable over a plurality of said bolts and beneath said lugs to thereby be secured to said cutting platform,
a plurality of spaced parallel support bars each extending forwardly of the mounting plate and each being between adjacent said slots therein, and a plurality of forwardly projecting fingers carried by respective said support bars.

2. A filler finger assembly according to claim 1, wherein surfaces in each said finger thereof comprise a knife receiving slot, the fingers extending to terminate forwardly of said knife receiving slots.

3. A filler finger assembly according to claim 1 wherein the upper surface of each said filler finger is a planar surface which underlies but terminates rearwardly of the forward point of a said knife with which it co-operates when the filler finger is mounted on the cutting platform.

4. On a grain harvester cutting platform having as original equipment a plurality of knife guard fingers which project forwardly of mounting lugs in spaced relationship with one another, a knife bar having drive means which reciprocally drives it across the cutting platform and knives thereon which co-operate with the knife guard fingers to sever the stalks of a grain harvester crop, and respective nut and bolt assemblies securing the lugs to the cutting platform, improvements comprising:
a plurality of filler finger assemblies each comprising a mounting plate, the mounting plates lying end to end across the cutting platform, each mounting plate having surfaces defining a plurality of rearwardly directed and rearwardly open slots which accommodate bolts of said nut and bolt assemblies, the mounting plate being secured thereby to the cutting platform and contiguous with the undersurfaces of a plurality of said mounting lugs,
a plurality of spaced parallel support bars extending forwardly of each said mounting plate but between the slots thereof, and filler fingers extending forwardly of respective said support bars.

5. Improvements according to claim 4 wherein each said filler finger comprises surfaces defining a rearwardly directed and rearwardly open knife receiving slot which accommodates a said knife with which it co-operates.

6. Improvements according to claim 5 wherein each said filler finger extends to terminate forwardly of its said knife receiving slot.

7. Improvements according to claim 5 wherein the upper surfaces of each said filler finger is a planar surface which underlies but terminates rearwardly of the forward point of a said knife with which it co-operates.

8. Improvements according to claim 5 wherein each said filler finger assembly comprises four said support bars carrying four respective said filler fingers.

9. Improvements according to claim 5 wherein each support bar is lower than said original equipment knife guard fingers.

* * * * *